April 8, 1947.  G. C. SCHÜLE  2,418,730
DEVICE FOR SUPPLYING AIR TO VEHICLE TIRES
Filed Jan. 13, 1944
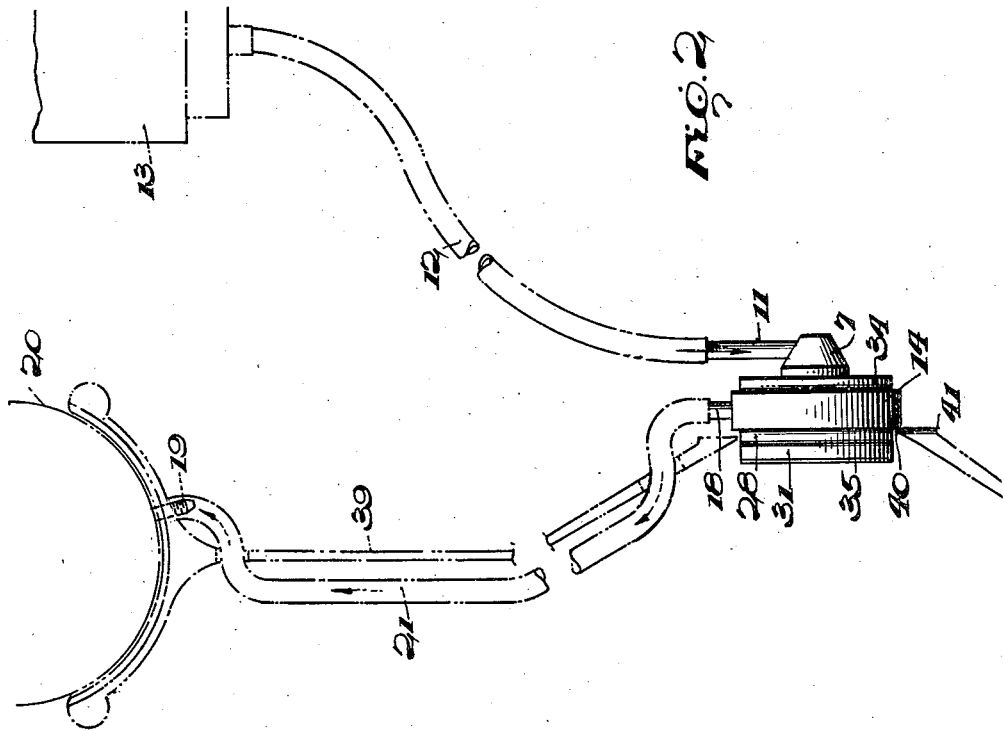
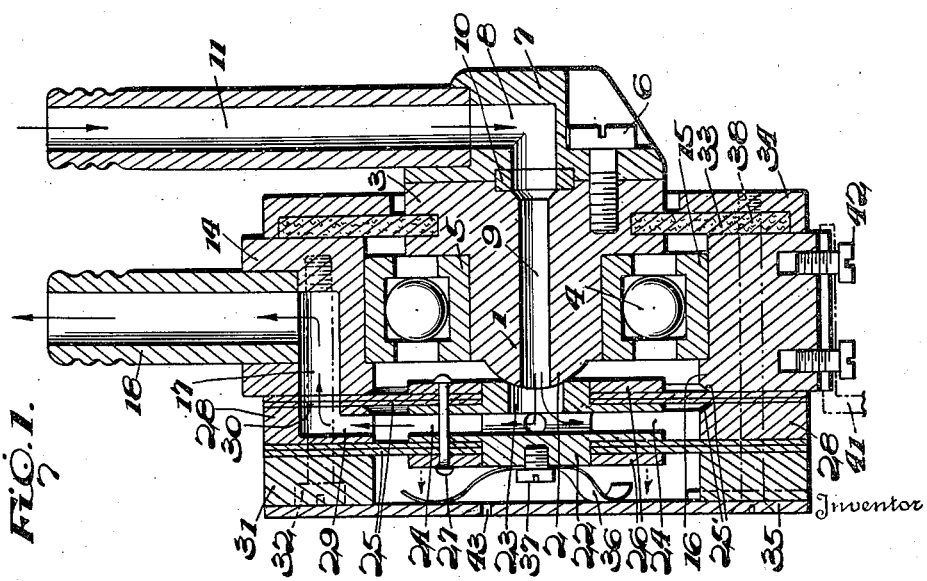
Inventor
By Georges C. Schüle
Attorney Patented Apr. 8, 1947

2,418,730

UNITED STATES PATENT OFFICE 2,418,730

DEVICE FOR SUPPLYING AIR TO VEHICLE TIRES

Georges Charles Schüle, Buenos Aires, Argentina

Application January 13, 1944, Serial No. 518,133

4 Claims. (Cl. 152—417)

This invention relates to a novel device for supplying air under pressure to the tires of automobiles, trucks and similar vehicles, and substantially has for object an improved and simple device of said kind which may be used for automatically supplying compressed air to the several tires of the wheels of a motor car or the like while they are running, so as to facilitate and ensure the maintainance in said tires of the necessary degree of pressure for convenient operation.

A further advantage of this novel type of device which forms the object of the present invention, consists in the fact that the same may be readily and speedily adapted to a motor car of any type, design or make, without necessity of introducing substantial modifications in the several parts or organs of the vehicle to which the device is to be applied.

In order that the invention may be clearly understood and conveniently carried into practice, a preferred embodiment of the same has been shown by way of example in the accompanying sheet of drawings, wherein:

Figure 1 shows a diametrical section, drawn to an enlarged scale, of the novel device for supplying compressed air, in accordance with this invention, and Figure 2 is a diagrammatical detail, showing one of the manners of applying the device to the wheels of a car.

The same numbers of reference have been used to indicate like or corresponding parts in both views.

In the form of construction shown, the novel device for supplying compressed air which forms the object of this invention, essentially consists of a stationary body, connected to a compressor or the like; a rotary element, suitably supported on said body by means of a ball bearing or the like, and in connection with the respective tire; a diaphragm means adapted to provide for constant communication between both connections, and means for adjusting the same to the several wheels of the vehicle.

The said stationary body or stator consists of a metallic casting 1, of cylindrical shape, formed at one of its ends with a spherical boss 2, and provided at its opposite end with a heavy flange 3, also of cylindrical conformation, which acts as a lateral support for a ball bearing 4, the inner race 5 of which is tightly secured to the said casting 1.

To the outer side of said flange 3 is secured by screws 6, or the like, a disk 7 having a right angular duct 8 whose horizontal portion is disposed axially of said disk and communicates with another duct 9 of smaller diameter also arranged axially of the body 1 and extending entirely through the same. In order to insure a fluid-tight connection between the ducts 8 and 9 a packing ring 10 of malleable metal is provided between the flange 3 and the disk 7.

With reference to Figure 1 it will also be seen that at the entrance of the duct 8 a short tube 11 is tightly secured, for connection, by means of another tube 12, to an air compressor 13 or the like, of any suitable type.

The rotary element or rotor of the device is constituted by a primary metallic ring 14, of cylindrical section, the internal surface of which is in tight adjustment with an outer race 15 of the aforesaid ball bearing, on said surface a shoulder 16 being formed, to serve as a lateral support for said race. A duct 17 extends partially, in an axial direction, through said primary ring 14, and deviates in a radial direction towards the outer part of said ring, a small tube 18 being secured, by threading or otherwise, in the outlet end, said parts 17—18 forming an angular passage for connection, as will hereinafter be explained, to the valve 19 of the respective tire 20 by means of another tube 21, of rigid or flexible material, within which any suitable means may be placed adapted for maintaining said valve constantly in its open position.

On the other hand, in a central position with regard to the stator body 1, an air distributing member 22 is provided, and formed with a partial axial bore 23, and a concave seat adapted to tightly fit against the rounded boss 2 of said body and from which extend in radial directions, ducts 24, opening on the free edge of said member; the latter element being also provided, on both lateral faces, with annular recesses in which are arranged, in parallel position one to the other, two diaphragms or flexible membranes 25, each formed by two or more superposed layers of fabric or other flexible material, conveniently waterproofed or otherwise rendered impervious, fitted to said member by metallic washers 26, affixed to the former by rivets or similar means 27.

Between said diaphragms or membranes 25 is placed a spacing washer 28, of plane shape and thickness substantially equal to the distance which separates the former, through which washer extends partially, in radial direction, a right angular duct 29, forming an angular passage whose short leg is directed radially inwards and registrations with an orifice 30, formed in one of said membranes, and with the duct 17 which forms part of the angular passage 17—18 of the primary ring 14.

Referring to Fig. 1 it will also be seen that the adjacent internal edges of the ring 14 and the washer 28 are provided with bevelled edges 25' to enable the membranes 25 to freely flex without being subjected to cutting or chafing due to otherwise sharp metal edges.

To the external surface of the outer membrane is applied a clamping ring 31 adjusted in position by means of three screws 32, threaded into the main rim or ring 14, so as to tightly clamp the free edges of both diaphragms 25 between the said members 31 and 14 and the spacing washer 28.

The flange 3 of the stator body 1 is provided on its periphery with a rectangular recess which receives a packing formed by a sealing disc 33 of felt or similar material, caused to bear against the outer face of the main rim 14 and covered, in turn, by a metallic disc 34. A cross-shaped spring 36 is secured by a screw 37 to the centre of said air distributing member 22, and said spring bears against the inner face of the plate 35 which tends to urge said air distributing member against the body 1, so that the boss 2 will seal the entrance of the orifice 9. The cover plates 34 and 35 are connected by means of three screws 38 which extend through all the interposed elements and thus maintain the same in assembled condition.

The novel apparatus above described may be adapted to the several wheels 29 of the vehicle in different ways, one of which has been illustrated, by way of example, in Figure 2. In this case, the washer 28 and ring 31, of smaller diameter, are passed through the central bore 40 of the wheel 39, or of the hub caps usually provided on said wheels, and are adjusted in position by angular bracket plates 41, affixed to the periphery of the primary ring 14 by screws 42 or the like. Under these conditions, the tube 18 which extends from said ring, is connected to the valve device 19 of the tire 20 by the tube 21, of rigid or flexible material, and provided, as before stated, with a suitable device for maintaining said valve permanently in its open position, while the tube 11, of the stationary element is connected by a duct 12 to a compressor 13, of any suitable type, adapted to be operated from the motor of the car.

In case of partial or complete deflation of a tire, due to puncture or other cause, the compressor 13 will be started and the air under pressure supplied by the same will be forced into the device through the tubes 12 and 11 and pass into the central duct 9 of the stator 1, whence it will proceed to the central duct 23 of the air distributing member 22 and afterwards pass through radial ducts 24 and the space between the diaphragms 25, ducts 29 and 17 and tubes 18 and 21 to the valve device 19 and thence into the tire 20. The tire will then be constantly maintained in an inflated condition under a predetermined and practically constant pressure. In view of the valve 19 being permanently held in its open position, air is allowed to pass freely from the compressor 13 to the tire 20, but, in case the pressure within the tire should exceed normal working pressure, said compressed air will be controlled by one or more known types of safety valves, not shown, and which may be provided with usual means for adjusting the degree of pressure required.

In order to facilitate the operation of the diaphragms 25, the cover plate 35 is provided with one or more orifices or bleed holes 43, for the escape of air which might accumulate between said disk and the adjacent diaphragms by leakage, while the air which may accumulate on the opposite face of the adjacent diaphragm will be allowed to escape to the outer air by unsealed surfaces between the bearing 4 and the members adjacent thereto.

On the other hand, the packing 33 will operate to prevent the escape of lubricant which fills the bearing 4 and adjacent spaces. Besides the ease of mounting and convenient structural features, which are apparent, the present device offers the advantage of efficient operation because the double diaphragm arrangement readily adapts itself to any tendency of the rotary parts to shift while the device is in operation thereby to assure uninterrupted connection between the source of compressed air and the tire.

Further advantages reside in the simplicity of the device whose parts are not likely to get out of order nor to receive concentrated wear, thus assuring long service; and by simply removing the screws 38 the disk 34 and the cover plate 35 may be readily removed so as to easily separate the stator from the several parts of the rotor.

From the foregoing it is believed that the features and advantages of the invention will be readily understood by those skilled in the art and it will of course be understood that modifications can be resorted to within the scope of the appended claims.

I claim:

1. A device for supplying compressed air to the pneumatic tires of vehicle wheels, comprising, a source of compressed air supply, a stator including a body having a central bore, a spherical boss at one end of the bore, a compressed air inlet at the other end of the bore communicating with said source of compressed air, a ball race mounted on the body concentrically with said bore; and rotor means for conducting air from the bore of said stator and to the tire of the vehicle, said means comprising a primary ring mounted on the ball race, an air distributing member, having radial openings and a central opening, and also having a concave seat, said central opening communicating with the bore of the body, means for yieldingly urging said seat against the spherical boss of the stator body, flexible membranes mounted in spaced apart relation on said air distributing member to form a chamber communicating with the said radial openings, outlet means on the primary ring in communication with the said chamber, and cover plates secured to the opposite sides of the rotor and sealing the rotor relative to the stator.

2. A device for supplying compressed air to the pneumatic tires of vehicle wheels, according to claim 1, wherein, the stator includes a tubular body having a central bore, a spherical boss at one end of the body, a flange at the opposite end of the body, a radially disposed air inlet nipple having an angular passage communicating with said bore and secured to said flange, a sealing washer extending outwardly of the flange and clamped between the said ring of the rotor and one of the cover plates, and said ball race being mounted on the outer face of the tubular body and adjacent said flange.

3. A device for supplying compressed air to the pneumatic tires of vehicle wheels, according to claim 1, wherein the primary ring carries the air distributing member and the flexible membranes, said membranes being spaced apart at their peripheral portions by an intermediate washer ring, one of said membranes having its outer portion held between a washer ring and the primary ring and the other membrane being held at its outer portion between said washer ring and a clamping ring, and said means for yieldingly urging the seat of the air distributing member toward the boss being positioned between said member and one of said cover plates.

4. A device for supplying compressed air to the tires of vehicle wheels, comprising, in combination with the wheel including a hub portion, a stator comprising a body having an axial bore and a spherical boss formed concentrically with said bore, said body being provided at the side opposite the boss with a flange, a ball race fitted to the body between the spherical boss and said flange, an inlet nipple carried by the exposed face of said flange and communicating with a source of compressed air; a rotor fixed to the hub portion of the wheel and comprising a primary ring fitting over said ball race, and having an angular passage therein, a nipple leading from said angular passage to the pneumatic tire of the vehicle, and means cooperating with the spherical boss on the body for conducting compressed air through the bore thereof to said angular passage of the ring and the nipple carried thereby, said means comprising, an air distributing member having a central opening extending partially therethrough and radial openings in communication therewith, said member having a seat for engaging the spherical boss, a pair of flexible membranes secured to the air distributing member in spaced apart relation to form an intermediate chamber for establishing communication between the bore of the body and the angular passage of the primary ring, a washer for spacing the outer edges of the membranes and having an angular passage communicating with the space between the membranes and the angular passage of the said primary ring, a cover plate spaced from the face of the air distributing member opposite said body, a spring confined between said cover plate and said air distributing member for urging the latter against the spherical seat of the body, a sealing washer located at the side of the ring opposite said cover plate, a second cover plate concealing said sealing washer, fastenings piercing both cover plate and the ring to secure the same together.

GEORGES CHARLES SCHÜLE.

REFERENCES CITED

The following references are of record in the file of this patent:

UNITED STATES PATENTS

| Number | Name | Date |
|---|---|---|
| 2,107,405 | Williams | Feb. 8, 1938 |

FOREIGN PATENTS

| Number | Country | Date |
|---|---|---|
| 282,678 | Great Britain | 1928 |